United States Patent [19]

Gross et al.

[11] Patent Number: 4,840,974

[45] Date of Patent: Jun. 20, 1989

[54] METHOD FOR REDUCING SILICONE FOAM DENSITY AND SILICONE FOAM COMPOSITIONS

[75] Inventors: David C. Gross, Schenectady; Larry N. Lewis, Scotia, both of N.Y.; Connie L. Haig, Evansville, Ind.

[73] Assignee: General Electric Company, Schenectady, N.Y.

[21] Appl. No.: 280,081

[22] Filed: Dec. 5, 1988

Related U.S. Application Data

[62] Division of Ser. No. 226,919, Aug. 1, 1988.

[51] Int. Cl.$^4$ .......................... C08G 77/00; C08J 9/02
[52] U.S. Cl. ...................................... 521/85; 521/91; 521/107; 521/122; 521/134; 521/154; 525/478; 528/15; 528/31; 528/32
[58] Field of Search ................... 521/85, 91, 107, 122, 521/134, 154; 525/478; 528/15, 31, 32

[56] References Cited

U.S. PATENT DOCUMENTS

| | | | |
|---|---|---|---|
| 3,923,705 | 12/1975 | Smith | 521/154 |
| 4,418,157 | 11/1983 | Modic | 521/154 |
| 4,599,367 | 7/1986 | Bauman et al. | 521/154 |

Primary Examiner—Morton Foelak
Attorney, Agent, or Firm—William A. Teoli; James C. Davis, Jr.; William H. Pittman

[57] ABSTRACT

A method is provided for reducing the density of silicone foam from a platinum catalyzed foamable two-package mixture of vinyl organosiloxane, organohydrogen siloxane, and hydroxylated material. The platinum catalyst used in the foamable mixture is in the form of a mixture of a platinum vinyl siloxane and a platinum triarylphosphine. A platinum catalyst mixture of platinum vinylsiloxane and triarylphosphine also has been found effective.

5 Claims, No Drawings

METHOD FOR REDUCING SILICONE FOAM DENSITY AND SILICONE FOAM COMPOSITIONS

This application is a division of application Ser. No. 226,919, filed Aug. 1, 1988.

BACKGROUND OF THE INVENTION

The present invention relates to a method of making silicone foam having reduced foam density and to silicone foam compositions used in such method. More particularly, the present invention relates to the use of a platinum catalyst in the form of a mixture of platinum vinyl siloxane and platinum triarylphosphine.

Prior to the present invention, elastomeric silicone foams were well-known. They have a variety of uses such as thermal and electrical insulators, flame barriers, and cushions. Even though elastomeric silicone foams are superior to organic foams in many instances, organic foams are often used based on economic consideration.

At the present time, commercially available silicone foam has a foam density which can provide a 15–25 pound/cubic ft. foam structure. One method of reducing the cost of elastomeric silicone foam, is to reduce foam density without altering the desirable physical properties of the foam material.

Although silicone foam may be made by using a blowing agent, or even mechanical mixing, another technique is by effecting the generation of hydrogen gas using a platinum catalyst as shown by Smith, U.S. Pat. No. 3,923,705. Elastomeric silicone foams can be made by forming a mixture of a silanol, a silicone hydride, and a vinyl-containing silicone in the presence of a platinum catalyst. There is effected the simultaneous generation of hydrogen gas along with cross-linking. For example, Modic, U.S. Pat. No. 4,189,545 produces silicone foam by adding water to a composition of a vinyl-containing siloxane, a hydride-containing siloxane and platinum to generate hydrogen simultaneously with cross-linking. Modic, U.S. Pat. No. 4,418,157 shows the strengthening of silicone foam by adding a resinous copolymer, while Bauman et al., U.S. Pat. No. 4,599,367 reduces silicone foam density by using a combination of silanol and water.

The present invention is based on the discovery that a substantial reduction in silicone foam density can be achieved by utilizing a platinum catalyst in the form of a mixture of a platinum vinyl siloxane complex and a platinum triaryl phosphine to effect the generation of hydrogen in a foamable composition comprising vinyl-terminated polydiorganosiloxane, a vinyl-containing organosiloxane, a hydride polysiloxane, and a hydroxylated material, all of which materials are defined more particularly below. It also has been found that the employment of a small amount, such as 0.5% to 10% by weight of the total foamable mixture, of fumed silica, treated with cyclic organosiloxane, such as octamethyl cyclotetrasiloxane, results in a significant improvement in the cell structure of the cured foam.

STATEMENT OF THE INVENTION

There is provided by the present invention a foamable composition comprising by weight, (A) 100 parts of a vinyl-terminated polydiorganosiloxane,
(B) 0.5 to 50 parts of a hydride polysiloxane,
(C) 0.2 to 10 parts of a hydroxylated material, and
(D) an effective amount of a platinum catalyst comprising
 (i) platinum vinyl siloxane complex, and
 (ii) a member selected from a platinum triarylphosphine and a triarylphosphine,
where there is present in the platinum catalyst, per part by weight of platinum of the platinum vinylsiloxane complex, from 0.2 to 4 parts of platinum of the platinum triarylphosphine or 0.2 to 3 parts of the triarylphosphine.

There can be used as the vinyl-terminated polydiorganosiloxane, (component (A) in the Statement of the Invention) polydiorganosiloxane fluids having a viscosity from about 100 to about 1,000,000 centipoise at 25° C., and preferably from about 2500 to 500,000 centipoise. The vinyl-substitution in the vinyl-terminated polydiorganosiloxane can range of from about 0.0002 to 3% by weight, and preferably from about 0.001 to about 1% by weight of vinyl-terminated polydiorganosiloxane. The vinyl-terminated polydiorganosiloxane is preferably terminated with vinyldiorganosiloxy units, and the organo radicals of the vinyl-terminated polydiorganosiloxane are selected from $C_{(1-20)}$ monovalent hydrocarbon radicals or $C_{(1-20)}$ monovalent hydrocarbon radicals substituted with radicals inert during equilibration.

There are included by the organo radicals of the vinyl-terminated polydiorganosiloxane alkyl radicals such as methyl, ethyl, propyl, etc.; cycloalkyl radicals, such as cyclohexyl, cycloheptyl, etc.; haloalkyl radicals such as trifluoropropyl; aryl radicals, for example, phenyl, tolyl, xylyl, naphthyl; haloaryl radicals such as chlorophenyl, nitrotolyl, nitrophenyl, etc.; alkenyl radicals such as vinyl, allyl. It is preferred that the organo radicals are selected from methyl, phenyl, vinyl, and 3,3,3-trifluoropropyl.

The vinyl-terminated polydiorganosiloxanes are well-known in the art and can be made, for example, by equilibrating cyclic polydiorganosiloxanes with or without vinyl substitution in the presence of appropriate amount of a vinyl chain-stopper such as a 1,3-divinyl tetraorganodisiloxane. Further details for making vinyl-substituted polydiorganosiloxanes can be found in Modic, U.S. Pat. No. 3,425,967 incorporated herein by reference.

The hydride polysiloxane which can be used in the practice of the present invention has the formula,

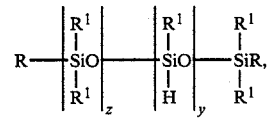

where R is selected from the group consisting of hydrogen, alkyl radicals of from 1 to 8 carbon atoms, aryl radicals of from 1 to 8 carbon atoms, and haloalkyl radicals of 3 to 8 carbon atoms, and $R^1$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight, and z, and y vary such that the polymer has a viscosity varying from 5 to 1,000 centipoise at 25° C.

Preferably, the hydride polysiloxane consists essentially of chemically-combined organosiloxy units having silicon-bonded hydrogen atoms attached to silicon to form the backbone of polysiloxane chain.

In addition to the hydride polysiloxane, the silicone-foam compositions of the present invention require a source of hydroxy radicals in the form of a hydroxylated material, as previously defined. In order to provide for effective foaming results, there can be used sufficient hydroxylated material to provide from about 0.02 to about 15 gram equivalents of hydroxy radicals, per gram equivalent of silicon-bonded hydrogen atoms of the hydride polysiloxane. Preferably, there can be used from about 0.2 to about 10 gram equivalents of hydroxy radicals, while 0.5 to about 7 gram equivalents of hydroxy radicals per silicon-bonded hydrogen will provide optimum results.

Among the hydroxylated materials which can be used in the practice of the present invention, there can be used hydroxylated silicones such as silanols which can be in the form of homopolymers, copolymers, or mixtures thereof. It is preferred that the silanol contain at least one organic radical in a molecule per silicon atom. For example, there can be used silanol-terminated polydimethylsiloxane as well as silanol-terminated siloxane having chemically combined dimethylsiloxy units, methylphenylsiloxy units, and methyl-3,3,3-trifluoropropylsiloxy units. Also included are mixtures of hydroxylated organosiloxane polymers and hydroxylated organosilanes, such as mixtures of hydroxy and end-block polydimethylsiloxane and diphenylmethylsilanol.

In addition to silanols, organic alcohols also can be used which are monohydric or polyhydric alcohols having from about 1–12 carbon atoms. Preferably, there can be used methanol, ethanol, propanol, butanol, lauryl alcohol, octyl alcohol, and ethyleneglycol. Combinations of silanols, water, and organic alcohols also have been found to be effective. Additional aspects of the use of the hydroxylated material in the reduction of silicone foams of the present invention can be found in U.S. Pat. Nos. 4,189,545; 4,418,157; 4,599,367; and 3,923,705.

An effective amount of the platinum catalyst used in the foamable composition is 10 ppm to 100 ppm of platinum based on the weight of foamable composition.

One component of the platinum catalysts which can be used in the practice of the present invention is shown by Karstedt, U.S. Pat. Nos. 3,775,452, and 3,715,334, which is formed by reacting chloroplatinic acid with tetramethyltetravinylcyclosiloxane in the presence of sodium bicarbonate in an ethanol solution. The resulting platinum vinylsiloxane complex can be utilized in the form of a organic solvent solution such as a toluene solution. The other component of the platinum catalyst utilized in the practice of the present invention is an organic solvent solution of $Pt(P(C_6H_5)_3)_4$ such as a methylene chloride solution.

In addition to $Pt(P(C_6H_5)_3)_4$, other phosphine complexes can be utilized as a cocatalyst with the aforementioned platinum vinylsiloxane or Karstedt catalyst. Such phosphine complexes include, for example, $Cr(CO)_5P(C_6H_5)_3$, $Cr(CO)_5PPh_3$ $Cr(CO)_4(PPh_3)_2$, (cis and trans isomers), $Cr(CO)_3 (PPh_3)_3$ (fac and mer isomers), Mo and W analogues of above Cr compounds; $Fe(CO)_4PPh_3$, $Fe(CO)_3(PPh_3)_2$ as well as the Ru and Os analogues of the above Fe compounds; $CoCl_2(PPh_3)$, $RhCl(PPh_3)_3$, $RhCl(CO)(PPh_3)_3$, $IrCl(Co)(PPh_3)_2$, $NiCl_2(PPh_3)_2$, $PdCl_2(PPh_3)_2$, $PtCl_2(PPh_3)_2$, and $ClAu(PPh_3)$. In addition, metal complexes, such as those above containing phosphines other than triphenyl phosphine, may be effective cocatalysts. These include, but are not limited to, $PME_3$, $PEt_3$, $PPr_3$, $PPr_3$, $P(c-C_6H_{11})_3$, $P(p-C_6H_4Me)_3$, $P(o-C_6H_4Me)_3$, etc. In addition, complexes containing phosphites such as $P(OPh)_3$, Arsines such as $AsPh_3$ and stibenes such as $SbPh_3$ may be effective cocatalysts.

In addition to the vinyl-terminated polydiorganosiloxane, there also can be utilized in the foamable compositions of the present invention, per 100 parts by weight of such vinyl-terminated polydiorganosiloxane, from 1 to 50 parts by weight of a resinous copolymer shown by Modic, U.S. Pat. No. 4,418,157, incorporated herein by reference, for example, consisting essentially of a resinous copolymer having a base polydiorganosiloxane, and an effective amount of a resinous copolymer selected from the group consisting of copolymers $(R^2)_3SiO_{0.5}$ (M) units, $R^2(C_2H_3)SiO$ (D) units and $SiO_2$ (Q) units, where $R^2$ is selected from the group consisting of alkyl radicals preferably having from 1 to 8 carbon atoms; aralkyl radicals, preferably having from 7 to 13 carbon atoms; alkaryl radicals, preferably having 7 to 13 carbon atoms; aryl radicals, preferably having from 6 to 14 carbon atoms; cycloalkyl radicals, preferably having from 6 to 8 carbon atoms; vinyl radical, allyl radical and fluoroalkyl radicals, preferably 3,3,3,-trifluoropropyl.

In addition to the aforementioned basic ingredients, the silicone foam composition can contain from 1 to 200 parts by weight of a filler, per hundred parts of foam composition. It is preferred to use extending fillers or reinforcing fillers, such as fumed silica and precipitated silica can be used in instances where it is desired to increase the physical properties, such as the tensile strength and tear strength of the resulting elastomeric silicone foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, α-quartz, clay, carbon, and graphite. In order to minimize the viscosity increase generally experienced when using reinforcing fillers, it can be heat treated with cyclic polysiloxanes or silazanes. A preferred filler in the practice of the present invention is ground quartz which has been found to enhance the burn-resistant properties of the composition as well as imparting some enhanced physical properties to the final cured silicone foam.

The silicone foam compositions of the present invention are generally used and stored as a two-part composition. Platinum catalyst is preferably incorporated with the vinyl-terminated polydiorganosiloxane. The hydroxylated material also can be added to the vinyl-terminated polydiorganosiloxane part along with the filler if utilized.

In forming the silicone foam, the hydride polysiloxane (part B) is rapidly mixed with the vinyl-terminated polydiorganosiloxane (part A) containing the hydroxylated material and platinum catalyst. The resulting composition can be poured into a cavity and allowed to stand. The composition, thereafter, can begin to crosslink and generate hydrogen simultaneously resulting in a cured elastomeric silicone foam at reduced density.

In order that those skilled in the art will be better able to practice the present invention, the following examples are given by way of illustration and not by way of limitation. All parts are by weight unless otherwise indicated.

EXAMPLE 1

A mixture of 40 grams of a blend containing 39% by weight of a polydimethylsiloxane having terminal dimethylvinylsiloxy units and a viscosity of about 75,000 centistokes, 16% by weight of a polydimethylsiloxane having terminal dimethylvinylsiloxy units and a viscosity of about 4,000 centistokes, 18% by weight of a methylsiloxane resin consisting essentially of chemically combined $SiO_2$ units and a ratio of 1.43 moles of trimethylsiloxy units, per 0.25 mole of methylvinylsiloxy units, 25% by weight of α-quartz, 2% by weight of calcium carbonate, 1.5% by weight of water, and 40 parts per million of platinum in the form of a platinum vinylsiloxane complex was blended with 0.144 grams of a methylenechloride solution of $Pt(P(C_6H_5)_3)_4$ which contained 5 weight % platinum. The mixture was blended for several minutes using a stainless steel spatula.

There was then added to the above blend, 4 grams of a mixture of 34% by weight of a vinyl-terminated polydimethylsiloxane fluid having a viscosity of about 75,000 centistokes and 66% by weight of a linear hydride polysiloxane having terminal trimethylsiloxy units and consisting essentially of methylhydrogensiloxy units having a viscosity of about 3100 centistokes. The resulting mixture was then blended vigorously for 30 seconds. A foam resulted which was allowed to rise and cure. The density of the foam was then measured after about one hour. The same procedure was repeated several times except that the concentration of the platinum-vinylsiloxane complex was varied between 20 parts per million to 80 parts per million. In addition, the platinum $(P(C_6H_5)_3)_4$ catalyst was varied over a range of from about 25 to 100 parts per million. In some instances, triphenylphosphine was used in place of the platinum $(P(C_6H_5)_3)_4$. In one instance, the platinum vinylsiloxane complex was introduced into the vinylpolydimethylsiloxane mixture separately as a 5 weight % platinum solution in xylene along with the platinum $(P(C_6H_5)_3)_4$ in methylene chloride. In this latter instance, there was used 0.046 grams of a 5 weight % platinum solution of platinum vinylsiloxane in xylene and 0.289 grams of the platinum triphenylphosphine catalyst in methylenechloride at 5 weight % platinum. The following results were obtained:

| Density of Silicone Foams Containing $Pt(P(C_6H_5)_3)_4$ and $P(C_6H_5)_3$ Co-Catalysts | | | |
|---|---|---|---|
| Pt vinylsiloxane (ppm Pt)[c] | $Pt(P(C_6H_5)_3)_4$[a] (ppm Pt)[c] | $P(C_6H_5)_3$[b] (equiv. of Pt) | Density (lbs/ft³) |
| 40 | — | — | 15.7 |
| 80 | — | — | 15.9 |
| 40 | 25 | — | 13.4 |
| 40 | 50 | — | 12.5 |
| 40 | 100 | — | 13.2 |
| 80 | 50 | — | 15.2 |
| 20 | 50 | — | 11.8 |
| — | 40 | — | no cure, some $H_2$ |
| 40 | — | 0.25 | 14.7 |
| 40 | — | 1.0 | 13.5 |
| 40 | — | 5.0 | no cure |

[a]Added as a 5 wt % Pt solution in $CH_2Cl_2$.
[b]Added as a 5 wt % $P(C_6H_5)_3$ solution in $CH_2Cl_2$.
[c]Ppm reported here are based upon weight of resin in "A" component. The concentration of Pt in the final foam is 65% of this value.

The above results show the optimum reduction in foam density is achieved when a combination of the platinum vinylsiloxane catalyst and platinum triphenylphosphine catalyst is used. It is important to note that $Pt(P(C_6H_5)_3)_4$ in the absence of the Pt vinylsiloxane complex does not result in a cured material. In some instances, an effect was also achieved with triphenylphosphine in combination with the platinum vinylsiloxane catalyst.

EXAMPLE 2

The procedure of Example 1 was repeated, except that platinum vinylsiloxane catalyst was separately added in a xylene solution along with the platinum triphenylphosphine catalyst in a methylenechloride solution. Proportions of the respective platinum catalyst were chosen so that the final weight percentage of methylenechloride and xylene in the resulting foam were maintained at 0.53 and 0.053 respectively. This procedure was used to demonstrate that the reduction in density of the silicone foam was independent of a solvent effect. The following results were obtained:

| Density of Silicone Foams Containing $Pt(P(C_6H_5)_3)_4$ and $P(C_6H_5)_3$ Co-Catalysts at a Fixed Xylene/$CH_2Cl_2$ Concentration[b] | | | | |
|---|---|---|---|---|
| Sample | Pt vinylsiloxane (ppm Pt)[a] | $Pt(P(C_5H_5)_3)_4$ (ppm Pt)[a] | $P(C_6H_5)_3$ (equiv. Pt) | Density (lb/ft³) | Gel Time |
| 1 | 40 | — | — | 14.9 | <2 m |
| 2 | 40 | 20 | — | 11.5 | 4 m |
| 3 | 40 | 40 | — | 11.2 | 6 m |
| 4 | 40 | 80 | — | 17.5 | 1–1.5 h |
| 5 | — | 40 | — | collapsed | >1.5 h |
| 6 | 40 | — | 0.5 | 13.3 | ~1.5 m |

[a]Based upon weight of resin in "A" component.
[b]Samples 1–4 and 6 contain 0.53% $CH_2Cl_2$ and 0.053% xylene. Sample 5 contains 1.07% $CH_2Cl_2$ and .107% xylene.

The results shown in the above table illustrate the dual nature of the platinum catalyst used in the invention. The erratic results obtained with sample 4 are likely due to insufficient stirring or agitation of the mixture.

EXAMPLE 3

The procedure of Example 2 was repeated, except that octamethylcyclotetrasiloxane ($D_4$) treated fumed silica (1.4% by weight) was substituted for 3.0% by weight of α-quartz and 0.2% by weight of $CaCO_3$. Mean cell diameter was measured with an IABS Interactive Image Analysis System. The physical properties of the foam samples shown below demonstrate that the combination of a platinum vinylsiloxane complex, a platinum triarylphosphine complex, and $D_4$ treated fumed silica resulted in a low density silicone foam with superior cell structure.

| Density and Mean Cell Size of Silicone Foams Containing $Pt(P(C_6H_5)_3)_4$ and $D_4$ Treated Fumed Silica | | | | |
|---|---|---|---|---|
| Pt vinylsiloxane (ppm Pt)[a] | $Pt(P(C_6H_5)_3)_4$[a] (ppm Pt)[a] | $D_4$ treated fumed silica (pbw) | Density (lbs/ft³) | Mean cell size (mm) |
| 40 | 0 | 0 | 15.9 | [b] |
| 20 | 49 | 0 | 10.4 | 1.42 ± 0.86[c] |
| 20 | 49 | 1.4 | 11.4 | 0.34 ± 0.18[d] |

[a]Based on weight of resin in "A" component.
[b]Mean cell size not measured on high density samples.
[c]128 cells measured.
[d]972 cells measured.

Although the above examples are directed to only a few of the very many variables which can be used in the practice of the present invention, it should be understood that the present invention is directed to a much broader variety of vinyl-terminated polydiorganosiloxane and methylhydrogensiloxane hydroxylated material in proportions of platinum vinylsiloxane catalyst and platinum triphenylphosphine catalyst as shown in the description proceding these examples.

What is claimed and sought to be protected by Letters Patent of the United States is as follows:

1. A foamable composition comprising by weight,
    (A) 100 parts of a vinyl-terminated polydiorganosiloxane,
    (B) 0.5 to 50 parts of a hydride polysiloxane,
    (C) 0.2 to 10 parts of a hydroxylated material, and
    (D) an effective amount of a platinum catalyst comprising
        (i) platinum vinyl siloxane complex, and
        (ii) a member selected from a platinum triarylphosphine and a triarylphosphine,
    where there is present in the platinum catalyst, per part by weight of platinum of the platinum vinyl siloxane complex, from 0.2 to 4 parts of platinum of the platinum triarylphosphine or 0.2 to 3 parts of the triarylphosphine.

2. A foamable composition in accordance with claim 1, having 0.5% to 10% by weight of fumed silica.

3. A foamable composition in accordance with claim 1, where the vinyl-terminated polydiorganosiloxane is a vinyl-terminated polydimethylsiloxane.

4. A foamable composition in accordance with claim 1, where the hydroxylated material is water.

5. A foamable composition in accordance with claim 1, where the platinum catalyst is a mixture of a platinum vinylsiloxane and platinum triarylphosphine.

* * * * *